(12) United States Patent
Peck (10) Patent No.: US 7,432,442 B2
(45) Date of Patent: Oct. 7, 2008

(54) SURFACE MOUNT POWER OUTLET

(75) Inventor: David M. Peck, Danbury, CT (US)

(73) Assignee: Hubbell Incorporated, Orange, CT (US)

( * ) Notice: Subject to any disclaimer, the term of this patent is extended or adjusted under 35 U.S.C. 154(b) by 55 days.

(21) Appl. No.: 11/594,989

(22) Filed: Nov. 9, 2006

(65) Prior Publication Data

US 2008/0135274 A1    Jun. 12, 2008

(51) Int. Cl.
*H01H 9/02*    (2006.01)

(52) U.S. Cl. ............... 174/53; 174/57; 174/135; 174/66; 439/107

(58) Field of Classification Search .......... 174/53, 174/57, 50, 135, 481, 66, 67; 439/373, 120, 439/501, 650, 653, 107, 536; 220/241, 242
See application file for complete search history.

(56) References Cited

U.S. PATENT DOCUMENTS

| D91,940 S | 4/1934 | Hollingsworth |
|---|---|---|
| 1,967,091 A | 7/1934 | Kempton |
| D100,602 S | 7/1936 | Patten |
| 2,072,585 A | 3/1937 | Frank |
| D148,349 S | 1/1948 | Florian |
| D159,084 S | 6/1950 | Ludwig |
| D162,592 S | 3/1951 | Swart |
| 2,577,974 A | 12/1951 | McKinley |
| 2,946,838 A | 7/1960 | Bellek |
| 2,991,327 A | 7/1961 | Bellek |
| 3,030,605 A | 4/1962 | Carissimi |
| 3,388,885 A | 6/1968 | Holmes |
| 3,864,511 A | 2/1975 | Morby et al. |
| 4,273,957 A | 6/1981 | Kolling, Jr. |
| 4,603,932 A | 8/1986 | Heverly |
| D296,889 S | 7/1988 | Poliak et al. |
| 5,401,184 A * | 3/1995 | Sundstrom et al. .......... 439/367 |
| 5,594,208 A | 1/1997 | Cancellieri et al. |
| 5,621,387 A | 4/1997 | Phillips et al. |
| 6,940,015 B2 * | 9/2005 | Fang ........................... 174/53 |
| 7,009,108 B2 * | 3/2006 | Vargas et al. ................ 174/530 |
| 7,078,624 B1 * | 7/2006 | Stewart ....................... 174/66 |
| 7,285,733 B2 * | 10/2007 | Bowman .................... 174/480 |
| 7,309,834 B1 * | 12/2007 | Byrd .......................... 174/53 |

* cited by examiner

*Primary Examiner*—Dhiru R Patel
(74) *Attorney, Agent, or Firm*—Jenae C. Avallone; Mark S. Bicks; Alfred N. Goodman (57) ABSTRACT

A surface mount power outlet for connecting to a plug includes a cover having a fin disposed on an outer surface and a substantially circular face with a plurality of slots for receiving a plug. The cover also has a substantially arcuate body disposed below the face, an open back, and a pocket on an inner surface adjacent the fin. A base having a base plate with a shape corresponding to the open back includes a tab protruding from the upper surface for matching up with the pocket when aligned with the fin to complete a rock and lock attachment. The configuration of the cover apertures dictates whether the power outlet accommodates a 30 amp or a 50 amp power receptacle.

20 Claims, 7 Drawing Sheets

SURFACE MOUNT POWER OUTLET

FIELD OF THE INVENTION

The present invention relates to a surface mount power outlet designed to be connected with a simple rock and lock motion of its cover and base. More particularly, the invention relates to a power range receptacle including an alignment feature on the top of its cover and a corresponding tab on its base plate for guiding together the components of the power outlet without a user having a clear line of sight.

BACKGROUND OF THE INVENTION

Conventional range receptacles can be difficult to wire because they have electrical wires with relatively small diameters. Some conventional devices do not have wire compressors.

Conventional range receptacles do not have a definitive alignment feature between the metal base plate and the cover. The lack of an alignment feature could negatively impact a secure fitting between the receptacle and the power plug, particularly where the user does not have a clear line of sight.

Ordinary range receptacles lack alignment tabs for maintaining the cover in place. This lack of alignment tabs makes keeping the cover in the correct location before the cover is fastened to the base plate difficult. Also, connecting the cover to the base in low light conditions in difficult because the user cannot see well enough to line up the cover with the base. This difficulty is common behind appliances such as between the rear of a washing machine and a wall because the washing machine is close to the wall and in adequate lighting exists to view the receptacle container.

Accordingly, a need exists for an improved surface mount power range receptacle having a rock and lock alignment that a user can operate without having a clear visibility such as lowlight conditions.

SUMMARY OF THE INVENTION

Accordingly, an object of the invention is to provide a surface mount power outlet having a locking mechanism on a top and a base for securing the receptacle.

Another object is to provide a surface mount power outlet having a smooth, contoured surface for easily grabbing the cover and for connecting the cover to, or removing the cover from, the base.

Still another object is to provide a surface mount power outlet having the base and the cover that a user can easily align without having a clear view of either member.

Yet another object is to provide a surface mount power outlet having the cover secured to the base with a locking means, such as a screw.

A further object is to provide a surface mount power outlet having a wire compressor for wiring the device with electrical wires having relatively small diameters.

Still another object is to provide a surface mount power outlet having alignment tabs to allow an installer to connect the cover and the base in low light areas typically associated with basements or behind household appliances (i.e. stoves, range tops, washing machines, etc.).

The foregoing objects are basically attained by providing a surface mount power outlet comprising a cover having a fin disposed on an upper surface and a substantially circular face with a plurality of slots for receiving a plug. The cover connects to a base having a shape corresponding with an open back of the cover. The base further includes a tab protruding from the upper surface for fitting below the surface of the cover adjacent the fin to aid the user in lining up the cover with the base.

By forming the surface mount power outlet in this manner, installers can easily line up the cover and base, rock the cover into place on the base, and then connect the cover to the base with a locking means such as a threaded screw.

As used in this application, the terms "top", "bottom", and "side" are intended to facilitate the description of the surface mount power outlet, are merely illustrative of the surface mount power outlet, and are not intended to limit the surface mount power outlet of the present invention to any particular orientation.

Other objects, advantages, and salient features of the present invention will become apparent from the following detailed description, which, taken in conjunction with the annexed drawings, discloses a preferred embodiments of the present invention.

BRIEF DESCRIPTION OF THE DRAWINGS

Referring to the drawings which form a part of this disclosure:

FIG. 11 is a rear, elevational view of the back of the base plate of the surface mount power outlet of FIGS. 1 and 4a.

DETAILED DESCRIPTION OF THE INVENTION

Figure 1:
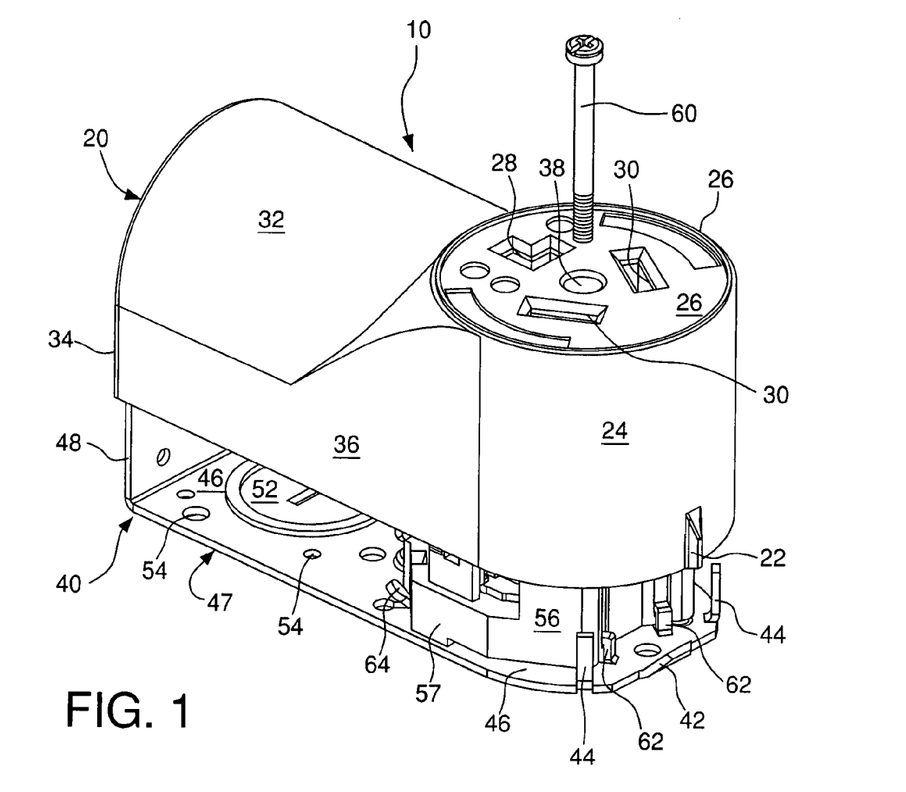
FIG. 1 is a perspective side view of the surface mount power outlet according to an embodiment of the present invention.

Turning to FIG. 1, the surface mount power outlet 10 includes a cover 20 aligned and tightly secured onto a base 40. The cover 20 includes a fin 22 disposed on its upper outer surface 24. Upper surface 24 is substantially curved to match the shape of a substantially circular face 26 of the cover 20.

Figure 2:
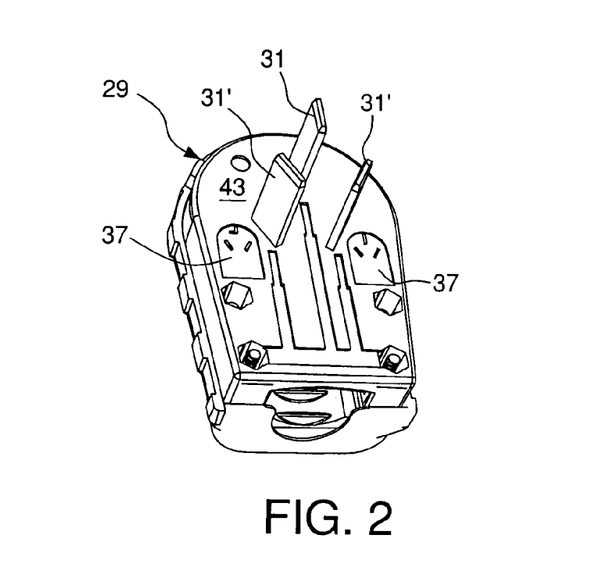
FIG. 2 is a rear, perspective view of a power plug that engages the surface mount power outlet of FIG. 1.
Figure 3:
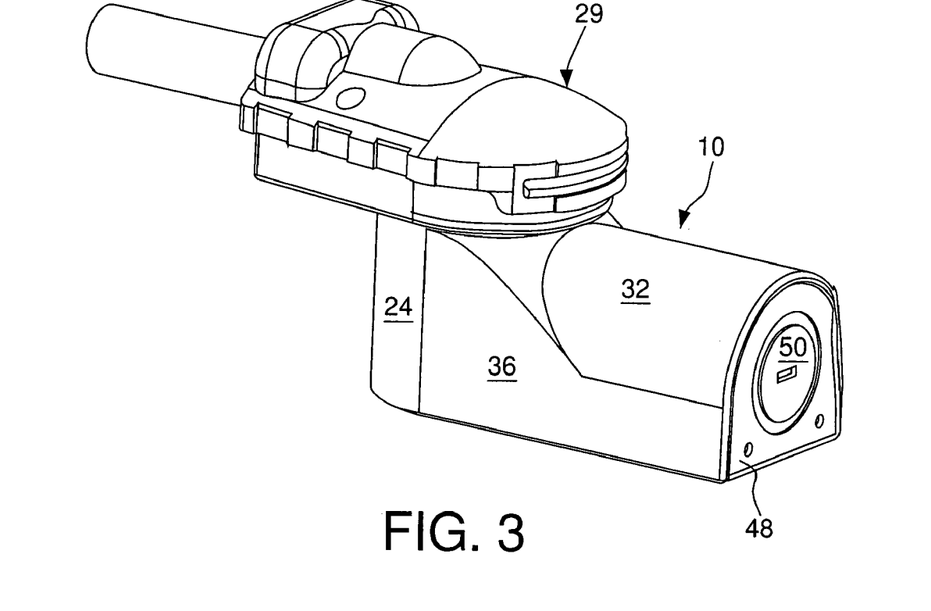
FIG. 3 is a side, perspective view of the surface mount power outlet of FIG. 1 connected to the power plug of FIG. 2.
Figure 5:
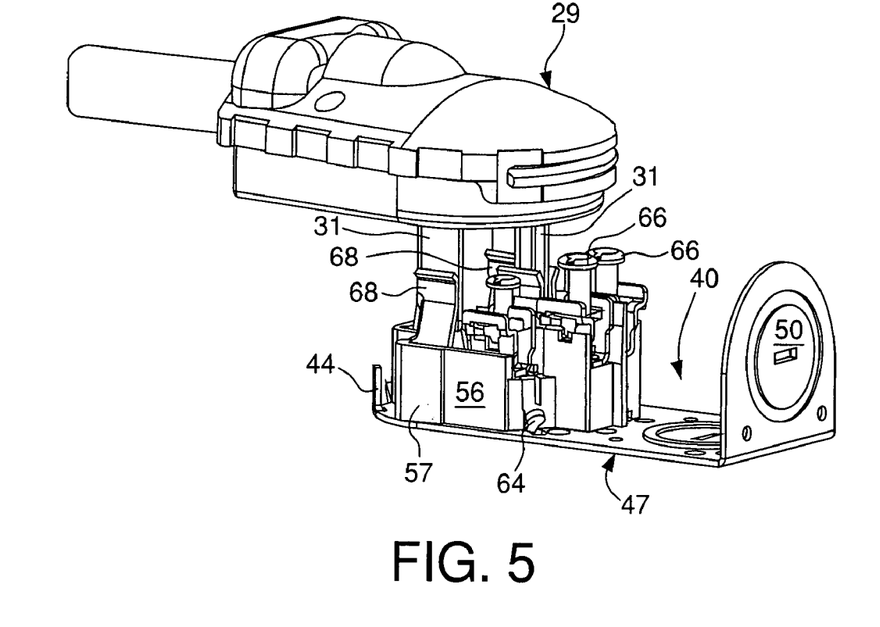
FIG. 5 is a side, perspective view of the surface mount power outlet of FIG. 4a attached to the power plug of FIG. 2 with the cover omitted.

In a first embodiment, the face 26 includes a plurality of slots or apertures 28, 30. One of the slots 28 is L-shaped for receiving a prong 31 of a plug 29, as seen in FIG. 2. The remaining slots 30 are rectangular-shaped for receiving the adjacent prongs 31' on the plug 29. The L-shaped slot 28 and rectangular-shaped slots 30 have beveled entries for receiving prongs 31, 31' and providing a tight seal between the plug 29 and the face 26, such that transmission of electrical power is contained strictly between the respective surfaces, as seen in FIGS. 3 and 5, when the plug 29 engages the surface mount power outlet 10. The slots 28, 30 are preferably disposed around a center slot 38. The plug 29 is coupled to the surface mount power outlet 10 by inserting the prongs 31, 31' into the apertures 28, 30, as seen in FIG. 3.

There are four disclosed embodiments (illustrated in FIGS. 1, 4, 4a, and 4b) for the configuration of the cover 20. The type of power receptacle desired, whether a 30 ampere or amp or 50 amp power receptacle, will control the face 26 configuration of the cover 20, ultimately selected by the installer or user. If a 30 amp surface mount power outlet 10 is needed, the face 26 will include at least one L-shaped slot 28. If a 50 amp surface mount power outlet 10 is needed, the face 26 will include all rectangular-shaped slots 30.

Figure 4:
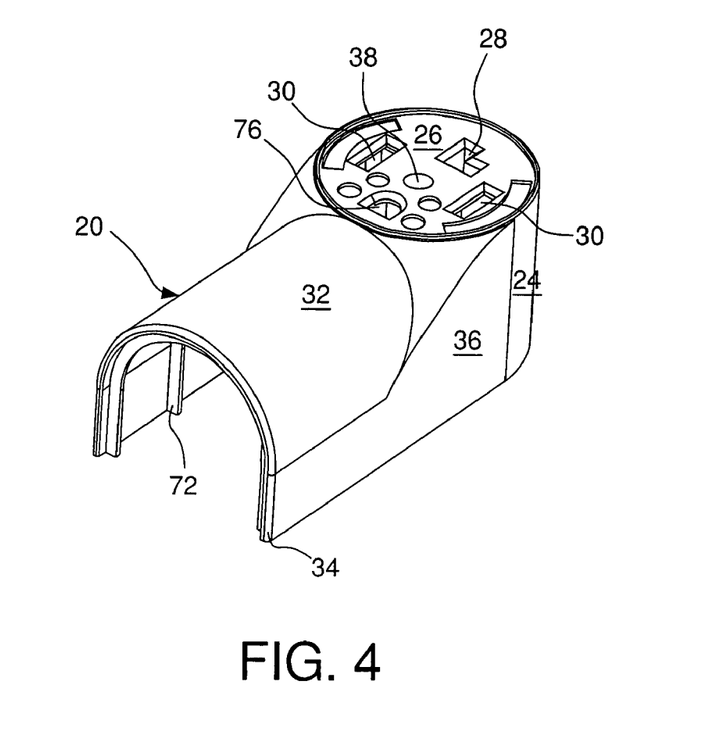
FIG. 4 is a front, perspective view of a surface mount power outlet having a plurality of apertures according to a second embodiment of the surface mount power outlet of FIG. 1.

As seen in FIGS. 1 and 4, two embodiments of the face 26 include an L-shaped slot 28 and a plurality of rectangular-shaped slots 30. Also, the face 26 in FIG. 4 can include a D-shaped aperture 76. This way, a 3-prong 30 amp plug and a 4-prong 50 amp plug can be utilized with FIG. 1 and FIG. 4, respectively.

Figure 4A:
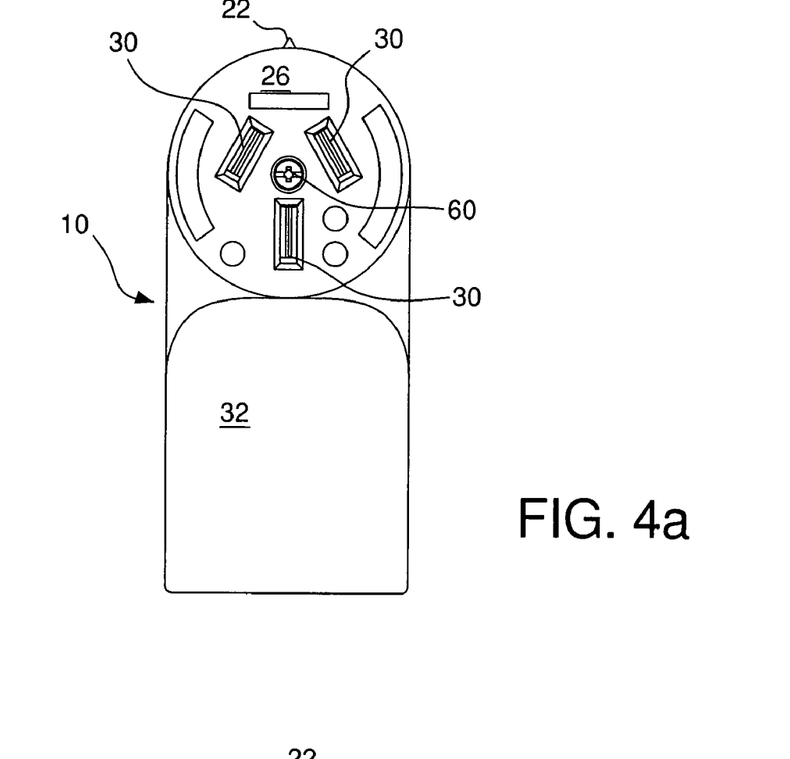
FIG. 4a is a front elevational view of a surface mount power outlet having a plurality of apertures according to a third embodiment of the surface mount power outlet of FIG. 1.
Figure 4B:
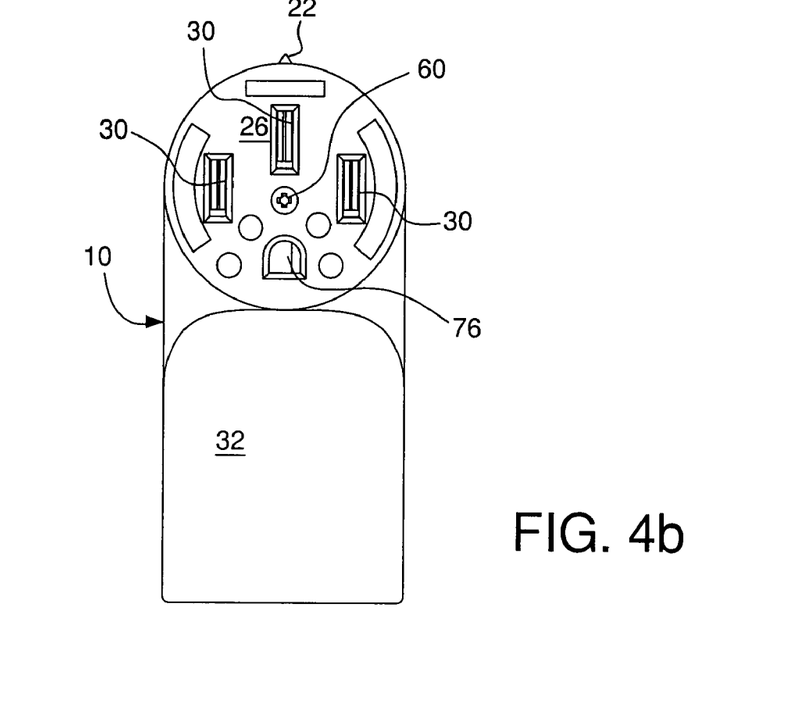
FIG. 4b is a front elevational view of a surface mount power outlet having a plurality of apertures according to a fourth embodiment of the surface mount power outlet of FIG. 1.

Based on the above differentiation, the surface mount power outlet 10 having face 26 illustrated in FIG. 4a accommodates a 50 amp plug with three prongs because the cover 20 includes all rectangular-shaped slots 30. The face 26 in FIG. 4b accommodates a 50 amp plug with four prongs because it includes three rectangular-shaped slots 30 and one D-shaped aperture 76. The controlling aperture is the L-shaped slot 28. The presence of this slot 28 is necessary for all 30 amp plugs and therefore 30 amp configured surface mount power outlets 10. Regardless of the aperture orientation of the face 26 chosen to support 30 amp and 50 amp receptacles, unless otherwise distinguished herein, the electrical features of the receptacle are conventional and vary according to the plug configuration with which it is used.

The middle body 32 of the cover 20 extends below the face 26. The middle body 32 is defined by an arcuate shape for allowing a user to easily grasp the sides 36 of the cover 20. This way, a user reaches around each side of the middle body 32 and grasps the sides 36 to attach or to remove the cover 20. This gripping is extremely important when the cover 20 is being attached to the base 40 because of the rock and lock alignment feature. The sides 36 extend from the upper surface 24 to the bottom 34 of the cover 20. The bottom 34 typically includes an opening for lining up with the base 40.

Figure 6:
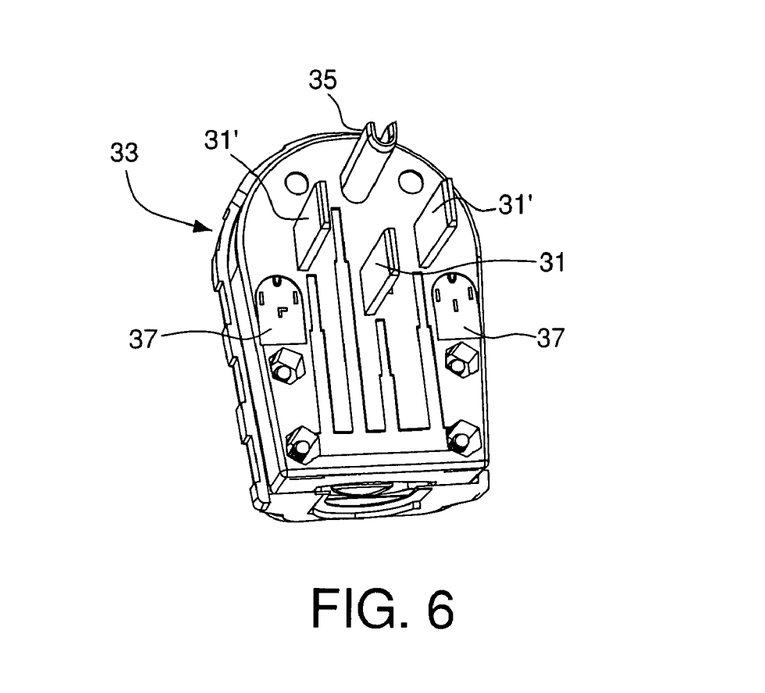
FIG. 6 is a rear, perspective view of a power plug that engages the surface mount power outlet embodiments of FIGS. 4 and 4b.

Plug 29, seen in FIG. 2, includes a plurality of prongs 31, 31' for engaging the L-shaped slot 28 and rectangular-shaped slots 30. A plug 29 having three prongs 31, 31' will be used for either a 30 amp or a 50 amp outlet, depending upon the configuration of the surface mount power outlet 10. Further to the above description, a plug 33 as shown in FIG. 6 can also be used for a 30 amp or a 50 amp outlet, depending upon the configuration of the surface mount power outlet 10, or more specifically, the configuration of the apertures on the face 26. Plug 33 includes rectangular shaped prongs 31' and a D-shaped prong 35 to engage the D-shaped aperture 76 of the second and fourth embodiments illustrated in FIGS. 4 and 4b, respectively. Similarly, prong 31 is interchangeable with an L-shaped prong, depending on which embodiment of the cover 20 is selected. If the cover 20 has the face 26 with a D-shaped aperture 76, an L-shaped aperture 28, and two rectangular-shaped apertures 30, the D-shaped prong 35 engages aperture 76, the rectangular-shaped prongs 31' engage rectangular-shaped apertures 30, respectively, and the lowermost rectangular-shaped prong 31 is replaced by an L-shaped prong so the L-shaped prong can engage the L-shaped slot 28.

Once the prongs 31, 31', 35 of plugs 29, 33 engage the slots 28, 30, 76 of the cover 20, they pass through to the base 40 and engage electrical terminals or contacts 68 that extend upwards from the receptacle 56. The terminals 68 transfer power between the receptacle 56 and the prongs 31, 31', 35 of the power plugs 29, 33.

The proper face 26 arrangement suitable for coupling to either the 3-prong plug 29 or the 4-prong plug 33 is illustrated on the rear surface 43 of each plug 29, 33. Plug 29 includes schematic surface maps 37 for the 30 amp outlet and 50 amp outlet, each outlet having three apertures so the user knows which plug 29, 33 to use for the various face 26 configurations. Plug 33 includes surface maps 37 for the 30 amp outlet and 50 amp outlet, each outlet having four apertures.

Figure 7:
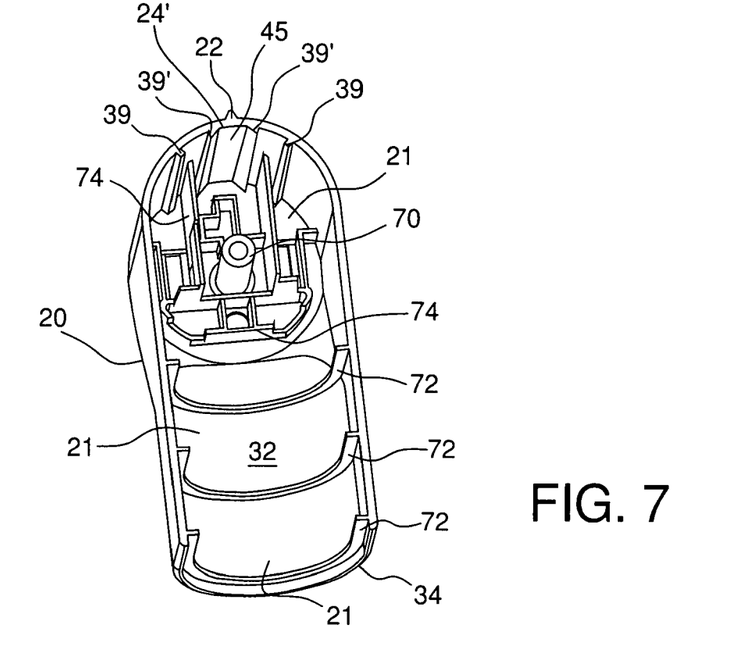
FIG. 7 is a rear, elevational view of the cover of the surface mount power outlet of FIG. 4.
Figure 8:
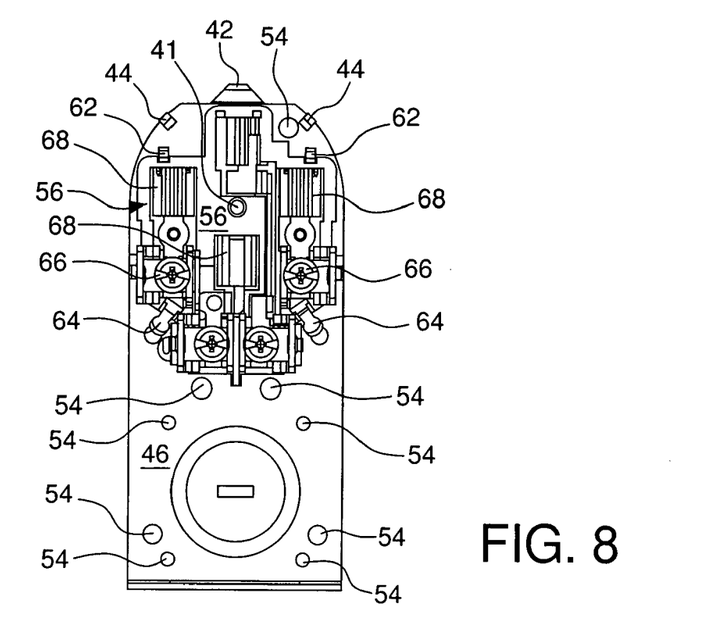
FIG. 8 is a forward, elevational view of the base of the surface mount power outlet of FIG. 4b.

The interior of the cover 20, as seen in FIG. 7, includes a column 70 for receiving an attachment means or fastener such as a screw 60 that fixes the cover 20 and base 40 together. The column 70 is located on the underside of first aperture 38 such that the screw 60 engages aperture 38 and drops into column 70 to connect to the second internally threaded aperture 41 located on the base 40, as seen in FIG. 8. The receptacle barrier wall 74 extends throughout the upper section of the cover 20 matching up with the base receptacle 56 (FIG. 5) when the cover 20 and base 40 are aligned.

Below the barrier wall 74, towards the bottom 34 of the cover 20, a plurality of horizontal partitions 72 extend across the middle body 32. These partitions 72 are evenly spaced alongside the interior of the cover 20 and arcuately shaped to match the contours of the middle body 32. They are structural supports for the cover 20. The lowermost partition 72 lines up with base wall 48 (FIG. 1) when the cover 20 and base 40 are connected.

The base 40 of the power outlet 10 includes a shape corresponding to the underside exterior edge or open back 21 of the cover 20. The base 40 includes a base plate 47 and a receptacle 56. A tab 42 protrudes from the base to fit into a pocket 45 (FIG. 7) on the underside or inner surface 21' of the cover 20, adjacent the cover fin 22 and outer surface 24. This positioning contributes to the self alignment rock and lock attachment of the apparatus 10 because the fin 22 guides the installer to place the cover over the base 40 such that the pocket 45 receives the tab 42. The pocket 45 extends between the innermost guides 39'. The distance between the guides 39' is equivalent to the shape of the tab 42.

The tab 42 is generally in the shape of an isosceles trapezoid with a flat peak. The tab 42 is substantially wider than fin 22 and angled slightly outwardly away from the cover 20, towards the upper surface 24 forming an obtuse angle with the planar back member of the base.

Before the fin 22 is aligned with tab 42, a series of protruding tabs 44 extending perpendicularly from the bottom surface 46 of the base 40 engages guides 39 on the interior surface of the cover 20. The tabs 44 sit adjacent to the guides 39 for channeling the cover 20 onto the base 40. As the cover 20 slides closer towards the base 40, the fin 22 lines up with tab 42, thus completing the rock and lock alignment.

The base plate 47 includes the wall 48 extending perpendicularly from the bottom surface or back member 46 opposite the tab 42. It connects with the bottom 34 opening of the cover 20 when the base 40 and cover 20 are coupled. A first knockout 50 on the wall 48 can be removed for receiving an electrical wiring. Further, best seen in FIG. 9, a corresponding second knockout 52 is similarly located on the bottom surface 46.

Figure 11:
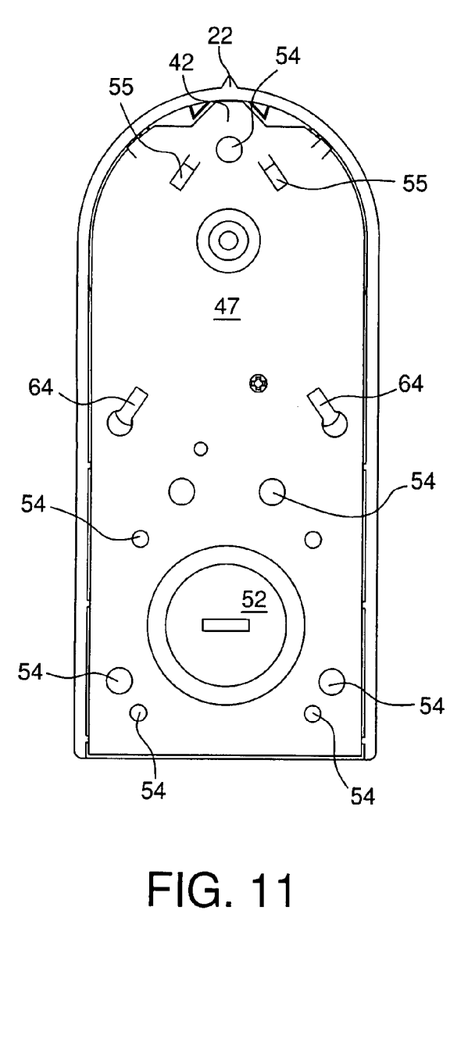
Figure 12:
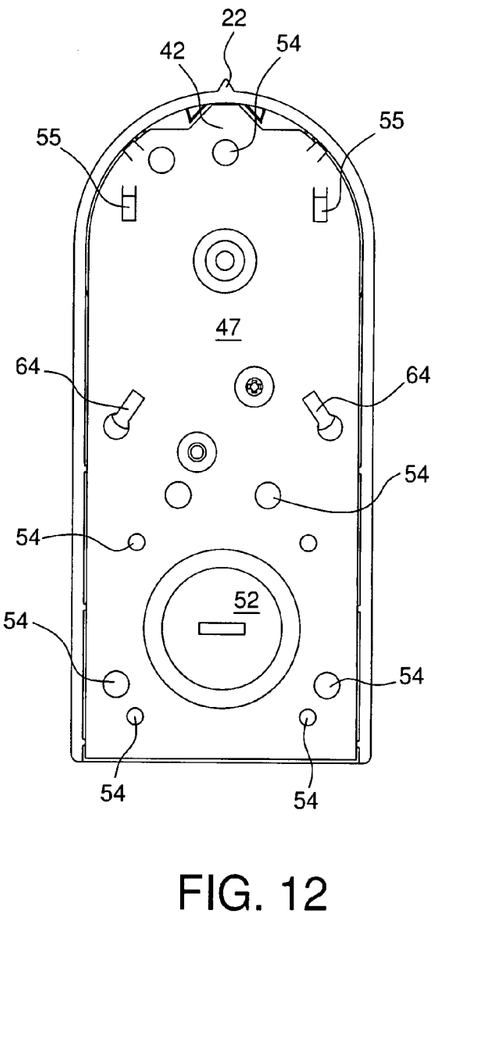
FIG. 12 is a rear, elevational view of the back of the base plate of the surface mount power outlet of FIGS. 4 and 4b.

Turning to FIGS. 11 and 12, a plurality of fastener receiving cavities 54 are scattered at various locations along the bottom surface 46 for receiving attachment or fastener means, such as a screw, that connects the surface mount power outlet 10 to a wall or similarly situated stabilization structure. These cavities 54 are best seen in FIGS. 11 and 12. They are a variety of sizes, but preferably circular in shape. FIG. 11 shows the back of the base plate 47 for the 3-pronged faces 26 whereas FIG. 12 shows the back of the base plate 47 for the 4-pronged faces 26. The major difference between the two base plate 47 configurations, as shown from the back, is with the placement of the contact apertures 55.

The contact apertures 55 in FIG. 11 are angled towards the middle of the base plate 47 to match up with the three contacts 68 of the receptacle 56, two of which are also angled towards the middle of the base plate 47.

The contact apertures 55 in FIG. 12 are oriented parallel to the middle of the base plate 47 to match up with the four contacts 68 of the receptacle 56, two of which are also oriented parallel to the middle of the base plate 47.

Figure 9:
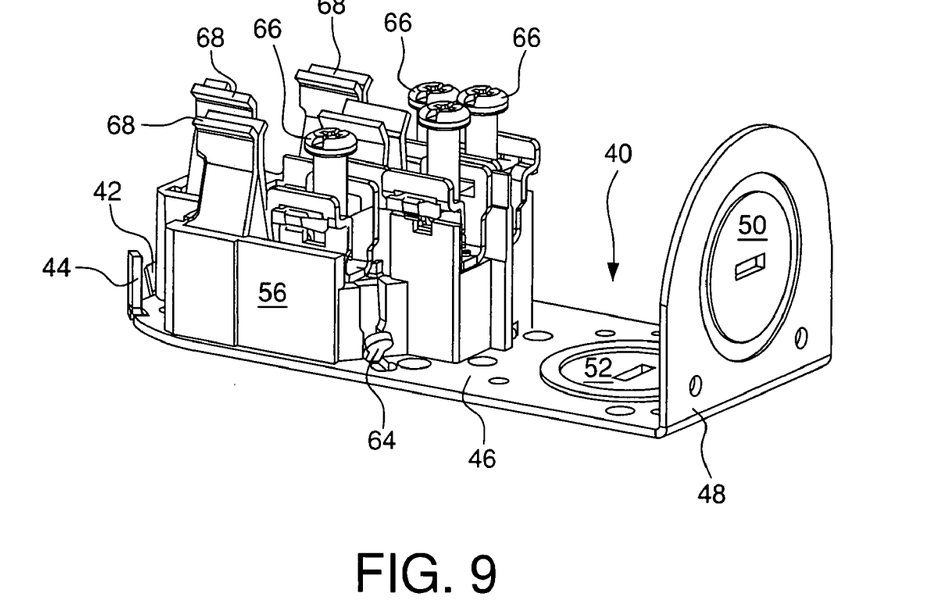
FIG. 9 is a side, perspective view of the base of surface mount power outlet of FIG. 4b.
Figure 10:
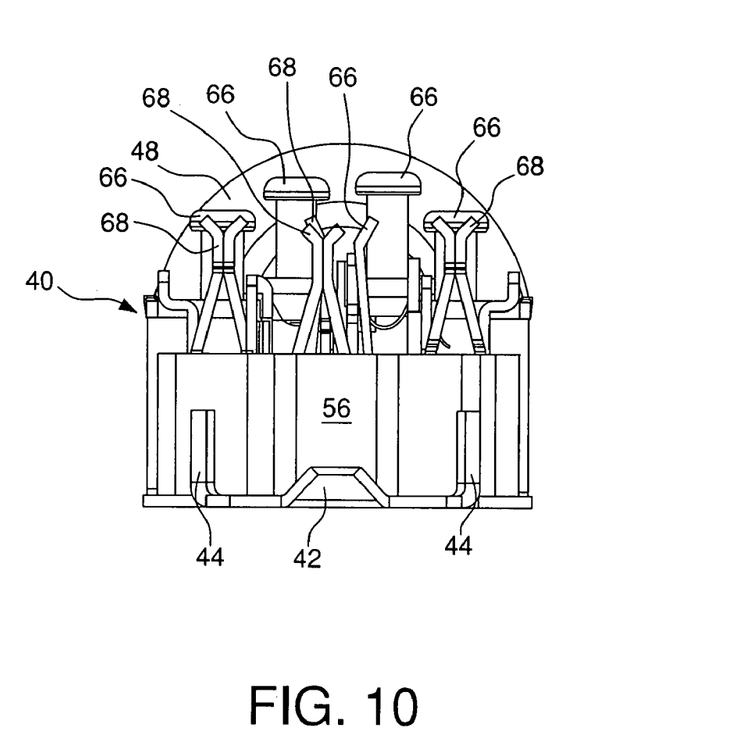
FIG. 10 is a bottom, elevational view of the base of the surface mount power outlet of FIG. 4b.

Also seen in FIGS. 9 and 10, the base 40 further includes a receptacle 56 for providing or transmitting electrical power to the power outlet 10. The receptacle 56 is made up of a housing 57 and the plurality of terminals 68. The receptacle 56 is connected to the base 40 with a plurality of snaps 62 (FIGS. 1 and 8). The snaps 62 are smaller than the protruding tabs 44 and situated inside the base 40 and inward from the tab 42 to secure the receptacle 56 to the base 40. Receptacle 56 is located towards the upper portion of base 40, closest to the tab 42 and corresponding to the underside of the face 26 and its slots 28, 30, 76 such that when a plug is inserted into the L-shaped slot 28, the rectangular-shaped slots 30, and the D-shaped aperture 76, power is transmitted from the receptacle 46 to the electrical plug 29.

The receptacle 56 includes a second aperture 41 for receiving a screw 60. Screw 60 passes through first aperture 38 and is threaded into second aperture 41. This screw secures the cover 20 to the base 40 and prevents the two pieces from detaching. Although only the interior of the surface mount power outlet 10 having four prongs is described, the interior of the surface mount power outlet 10 having three prongs is similarly situated.

Closure tabs 64 further secure the receptacle 56 to the base 40. Closure tabs 64 are cutouts from the metal surface of the base 40 and fold back over the receptacle 56 once the receptacle 56 is attached to the base 40. Screws 66 hold wires in place between the barriers of the receptacle 56.

While particular embodiments have been chosen to illustrate the invention, it will be understood by those skilled in the art that various changes and modifications can be made therein without departing from the scope of the invention as defined in the appended claims.

What is claimed is:

1. A power outlet comprising:
a cover having a fin disposed on an outer surface, a substantially circular face with a plurality of slots for receiving a plug, a substantially arcuate body disposed below said face, an open back, and a pocket on an inner surface of said cover adjacent said fin; and
a base having a base plate with a shape corresponding to said open back and including a first tab protruding from an upper surface of said base received within said pocket when said cover is connected to said base.

2. A power outlet according to claim 1 wherein
said cover further includes a first aperture for receiving a fastener.

3. A power outlet according to claim 2 wherein
said first aperture is disposed between said plurality of slots.

4. A power outlet according to claim 3 wherein
said base includes a second aperture for receiving and engaging said fastener extending through said first aperture.

5. A power outlet according to claim 4 wherein
said fastener is a screw.

6. A power outlet according to claim 1 wherein
said base includes at least two additional protruding tabs extending perpendicular to said base plate and facing said cover.

7. A power outlet according to claim 1 wherein
said base further includes a plurality of fastener receiving cavities located at various positions alongside said base.

8. A power outlet according to claim 1 wherein
said base plate includes a wall projecting from a bottom surface, at an end thereof opposite said tab, said wall including a first knockout.

9. A power outlet according to claim 8 wherein
said bottom surface includes a second knockout.

10. A power outlet according to claim 1 wherein
said cover further includes a plurality of slots for receiving a plurality of prongs attached to a 30 ampere electrical plug.

11. A power outlet according to claim 10 wherein
one of said slots is substantially L-shaped and others of said slots are substantially rectangular-shaped.

12. A power outlet according to claim 1 wherein
said cover further includes a plurality of slots for receiving a plurality of prongs attached to a 50 ampere electrical plug.

13. A power outlet according to claim 12 wherein
one of said slots is substantially rectangular shaped.

14. A power outlet according to claim 1 wherein
one of said slots is substantially D-shaped.

15. A power outlet according to claim 1 wherein
said base further includes a receptacle for transmitting electrical power to the plug.

16. A power outlet comprising:
a cover having a substantially arcuate body, a substantially circular face with a plurality of slots for receiving a plug, a first aperture disposed between said plurality of slots for receiving a screw, an open back, a fin on an end of said cover, and a pocket on an inner surface adjacent said fin;
a base having a base plate with a shape corresponding to said open back and including a first tab protruding from an upper surface received within said pocket when said cover is connected to said base, a wall projecting from a bottom surface of said base plate, at an end thereof opposite said first tab, said wall including a first knockout, at least two additional protruding tabs extending perpendicular to said base plate and facing said cover, and a second aperture for receiving said screw;
a plurality of partitions disposed on an underside of said cover;
a plurality of fastener receiving cavities located at various positions alongside said bottom surface; and
a receptacle between said bottom and said cover for transmitting electrical power to the plug.

17. A power outlet according to claim 16 wherein
said bottom surface includes a second knockout.

18. A power outlet according to claim 16 wherein
said plurality of slots is adapted for receiving a plurality of prongs attached to a 30 ampere electrical plug.

19. A power outlet according to claim 16 wherein
said plurality of slots is adapted for receiving a plurality of prongs attached to a 50 ampere electrical plug.

20. A power outlet according to claim 18 wherein
one of said slots is substantially L-shaped and the others of said slots are substantially rectangular-shaped.

* * * * *